United States Patent [19]

Spurlock

[11] 4,088,580
[45] May 9, 1978

[54] CLUSTER SCREEN FOR SAND CONTROL

[76] Inventor: James W. Spurlock, 7363 E. 58th Pl. S., Tulsa, Okla. 74145

[21] Appl. No.: 746,212

[22] Filed: Dec. 1, 1976

[51] Int. Cl.² .................. B01D 27/00; B01D 33/00
[52] U.S. Cl. .................. 210/323 T; 166/228; 166/231; 210/329; 210/345
[58] Field of Search .................. 210/323 T, 324, 329, 210/345, 449, 446, 460, 463, 510; 166/227, 228, 231, 232

[56] References Cited

U.S. PATENT DOCUMENTS

| Re. 14,756 | 11/1919 | Scott | 24/112 |
|---|---|---|---|
| 78,689 | 6/1868 | Parsons | 166/230 |
| 655,841 | 8/1900 | Watson et al. | 210/345 |
| 725,117 | 4/1903 | Morris | 210/460 X |
| 2,525,897 | 10/1950 | Greene | 210/354 X |
| 2,837,032 | 6/1958 | Horsting | 210/460 X |
| 2,946,445 | 7/1960 | Tursky | 210/345 X |
| 3,291,313 | 12/1966 | Davis | 210/354 |
| 3,319,793 | 5/1967 | Miller, Jr. et al. | 210/323 T |
| 3,709,293 | 1/1973 | Layne et al. | 166/232 |
| 3,747,765 | 7/1943 | Nowak | 210/323 T |
| 3,751,271 | 8/1973 | Kimura et al. | 210/510 X |
| 3,937,281 | 2/1976 | Harnsberger | 210/460 X |

Primary Examiner—John Adee
Attorney, Agent, or Firm—Head, Johnson & Chafin

[57] ABSTRACT

Apparatus for separating particulate matter from a flowing fluid which, for example, may be sand entrained in a flowing stream of oil and gas, comprises an assembly including a plurality of small diameter tubular elements, the walls of which have a selected permeability to said fluid. The tubular elements are held with their axes parallel between a pair of headers by suitable tension means. The interior of the tubes are connected to at least one plenum and to a well tubing. When this assembly is inserted into a well producing oil and gas which carries sand, the sand will be deposited against the outer walls of the tubular elements since the grain diameters are greater than the size of the openings in the walls of the tubular elements. The fluid flows through the openings in the wall of the tubular element, into the plenum and then through the well tubing to the surface of the well. By using suitable headers at each end, a plurality of these assemblies can be connected in series. This apparatus is equally applicable to the filtering of any type of particulate matter from any type of fluid.

16 Claims, 8 Drawing Figures

CLUSTER SCREEN FOR SAND CONTROL

BACKGROUND OF THE INVENTION

1. Field of the Invention

This apparatus lies in the field of filter apparatus. More particularly, it lies in the field of filter apparatus for separating particulate matter from a flowing fluid stream.

Still more particularly, this invention relates to a filtering apparatus for screening out sand from oil and gas flowing into a well, by permitting the oil and gas to flow through the permeable walls of the tubular elements and into the well tubing to the surface.

2. Description of the Prior Art

In the prior art there are a number of designs of sand screens for use in oil fields wherein a rigid skeleton structure is provided around which a wire is wound with suitable tension and suitable spacing, to permit the flow of oil without the flow of sand of sizes greater than a selected minimum. These designs typically require the use of a gravel pack sized to retain the formation sand which bridges and restrains the passage thereof into the production tubing.

Because of the large diameter and surface area of the prior art devices, the skeleton must be extremely rigid and strong to resist the forces acting radially inward on the wall by the sand, which compacts itself around the outside of the wire screen. Furthermore, in the prior art this single larger diameter screen has a maximum diameter which is the function of the diameter of the casing. There is no way of increasing the area except to make the device longer and longer, which entails considerable difficulty in providing suitable strength to the skeleton on which the wires are wound.

SUMMARY OF THE INVENTION

It is a primary object of this invention to provide a filter apparatus which is adapted to filtering any type of particulate matter from a flowing fluid stream.

It is a further object of this invention to provide greater surface area than in conventional filters.

It is a further object of this invention to provide a filter screen that requires no gravel packing but is gauged to sort and bridge the sand and thus act to prevent further sand passage from the formation into the production tubing.

It is a still further object of this invention to provide a sand screen filter that has considerably greater surface area exposed to the particulate laden fluid stream than is provided by the prior art screens which have a single large diameter cylindrical surface.

It is a further object of this invention to provide a type of sand screen which is less sensitive to erosion by the flowing particulate matter than is the conventional large diameter single screen type of device.

It is a still further object of this invention to provide a type of filter apparatus that is adapted to the flow of any type of fluid with any type of particulate matter, in which the cylindrical elements can be constructed of porous metal such as sintered metal having a selected permeability or in which the elements can be constructed of fritted glass spheres, or can be constructed of porous porcelain having the selected value of permeability or of other materials.

While this invention can be applied to the filtering of any fluid with any type of particulate matter, it is particularly adapted to be used for screening sand from oil flowing into a well at the bottom of a casing inside a borehole. It will therefore be described in detail in this application, which is solely for illustrative purposes, since the invention can be used in many other forms, in many other materials.

These and other objects are realized and the limitations of the prior art are overcome in this invention by providing an assembly including a plurality of small diameter tubular filter elements of selected outer diameter and length. These elements are held in a support apparatus which includes two header plates which have counterbored openings. The openings are substantially equal in diameter to the inner diameter of the cylindrical elements, while the counterbores are of a diameter substantially equal to the outer diameter of the elements. Tension means are provided to hold these elements in a selected, two-dimensional array, between the two headers so that at least a part of the outer surface is exposed to the flow of particulate matter-laden fluid.

One convenient array is to provide a plurality of coaxial circular arrays of tubular elements. For example, one array might hold six elements and another coaxial array might hold twelve elements, with a tension means such as a bolt positioned at the axis of the two arrays. Of course, more than two circular arrays are possible.

The header assembly at one end can be a closure or header plate, having a plurality of counterbored openings into which the ends of the tubular elements are inserted. The header assembly is designed with a plenum inside, which is connected through the openings in the header plate so that the flow of liquid through the perforations or openings in the walls of the tubular elements passes into the inside of the elements and through the openings in the header plate into the plenum. The liquid is then carried though a well tubing up the well to the surface or to a pump which forces the liquid up to the surface.

The cylindrical elements can be constructed in many ways, such as by using sintered metal, or perforated thin walled cylinders supported around a skeleton or by any of the commercial means for making wire wound screens in the prior art. The principal feature of the invention lies in the use of a plurality of small diameter tubular elements, which in total provide a greater surface area for the flow of fluid than does a single large diameter wire screen which would circumscribe the plurality of tubular elements as in the conventional sand screens.

BRIEF DESCRIPTION OF THE DRAWINGS

These and other objects and advantages of this invention and a better understanding of the principles and details of the invention will be evident from the following description taken in conjunction with the appended drawings, in which.

DETAILED DESCRIPTION

Figure 1:
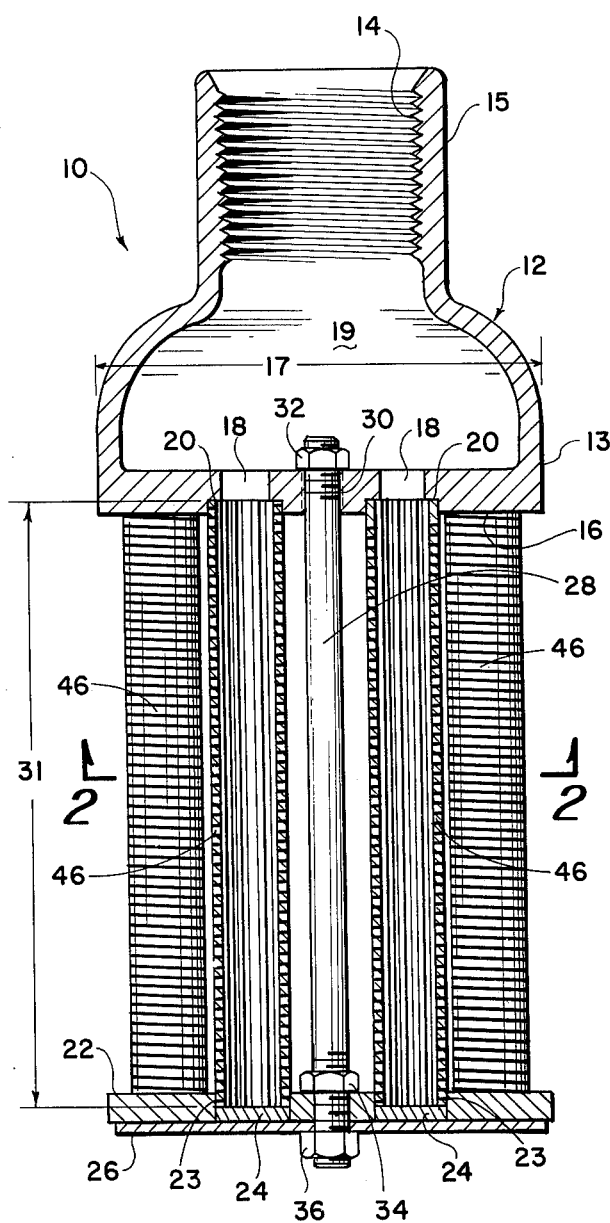
FIGS. 1 and 2 show an elevation section and a plan section of the invention.
Figure 2:
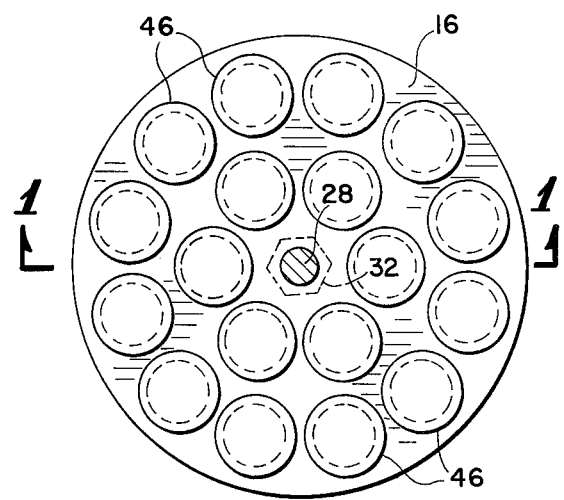

Referring now to the drawings and in particular to FIGS. 1 and 2, there are shown two views of the invention indicated generally by the numeral 10. FIG. 1 is a vertical section taken along the plane 1—1 of FIG. 2 and FIG. 2 is a cross-section taken along the plane 2—2 of FIG. 1. The device includes a header structure indicated generally by the numeral 12, which comprises a header plate 16 which is connected to a pipe coupling 15 having internal threads 14, which may be welded to the plate 16 by means of an intermediate cylinder 13. The internal volume 19 constitutes a plenum.

The diameter 17 is such as to be suitable for introduction into a casing in an oil well. The length 31 is chosen to provide a suitable surface area to the plurality of tubular elements 46 so as to provide sufficient filtering area. The length might range from several inches to several feet or more.

The header plate 16 includes a plurality of openings 18 in a selected two dimensional array such as illustrated in FIG. 2 for example. These openings 18 are counterbored to a diameter 20, which is slightly greater than the outer diameter of the tubular elements 46. The inner diameter of the tubular elements 46 is substantially equal to the diameter of the openings 18.

The tubular elements 46 are constructed in any selected way which will provide a rigid tubular element of a selected outer diameter and selected length with a selected permeability for the flow of fluid through the cylindrical wall of the tubular element.

As will be explained later, the diameter of the counterbore is slightly greater than the outer diameter of the elements to permit rotation of the elements while keeping the annular space between the elements and the counterbore wall small enough to exclude sand.

A suitable permeability can be provided in any desired way, such as for example by drilling or otherwise perforating a thin walled metal cylinder, by wire wrapping a rigid skeleton with a selected spacing between the turns of the wire, by preparing a small diameter cylinder of fritted glass beads of a selected diameter to provide a selected permeability, by using powder metallurgy to provide a metal tube having a selected permeability to the flow of gases or liquids or by other means.

The manner of construction of one type of tubular element will be described in detail in connection with FIGS. 4, 5, 6 and 7.

There is a second support or header plate 22 which has the same diameter 17 as the header plate 16 of the header assembly 12. This plate 22 has a plurality of openings of diameter of the counterbores 20 in the same two dimensional spacing as the plate 16. Thin circular discs 24 of suitable diameter and thickness are placed over the ends of the elements 46 in the openings 23 in the plate 22. These discs and the tubular elements are held within the plate 22 by a second plate 26 and by means of a bolt or other tension means 28. Bolt 28 is locked to the plate 16 by means of a nut 32 in an axial opening 30. The plates 22 and 26 are held by means of nuts 34 and 36 as would be understood by one skilled in the art. By tightening the nut 36 to securely hold the plates 22 and 26 against the nut 34 the spacing between plates 16 and 22 is maintained at a selected value, whereas the actual spacing of the tubular element within its opening may permit it to have a very slight freedom to move longitudinally and to rotate within the openings 20 and 23.

It will be clear that the structure of plates 22 and 26 with openings 23 and discs 24 can be replaced with shallow holes of the same diameter 23 in a single plate like 22.

This freedom to rotate under the influence of a high velocity stream of sand-laden oil and gas is a distinct advantage of this invention since as the fluid stream impinges on the tubular element it will tend to erode the surface to the point where the wires may be cut and openings enlarged to permit the sand to flow into the tubular elements.

In the case of the prior art screen which is a large diameter screen which is rigidly clamped to the tubing, there is no freedom to rotate. Furthermore, the surface is substantially perpendicular to the radial flow of oil and sand against it so that at the perforations through the casing where a high velocity flow exists it is relatively easy for the stream to erode openings through the old-fashioned screen. However, with the small diameter screen, the high speed flow of oil and sand is not directed against a substantially flat wall but against a small diameter cylinder so that the beam can be deflected easily. Furthermore, the force of the stream on the element can cause the element to rotate and to present a different area to the flow so that the depth of erosion at any one point can be minimized.

The design illustrated in FIG. 1 is one in which the length 31 can be varied but there is only a single assembly of cylindrical elements which can be connected to the tubing.

Figure 3:
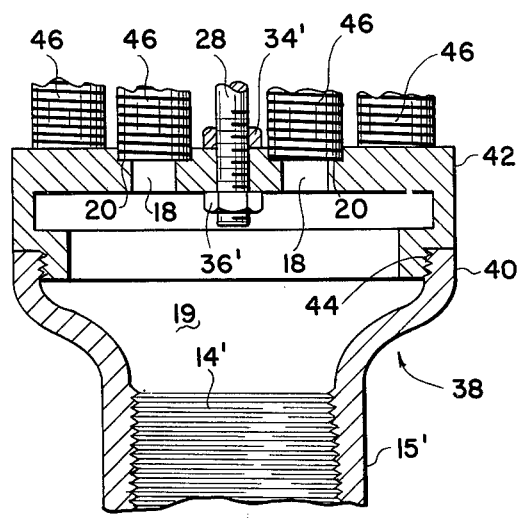
FIG. 3 shows an alternative second positioning and clamping means to hold the tubular elements.

FIG. 3 illustrates a second embodiment of the header assembly 38 such as can be placed on the lower end of FIG. 1 to replace the header plates 22 and 26. The bottom header plate 42 is similar to that of 16, but the complete header is made in two parts, the header plate 42 and the header 38. They may be removably attached as by screw threads or other means. In assembling the device instead of the plates 22 and 26 the header plate 42 is used and the nut 36' is tightened against the nut 34' on the central bolt 28. The header 38 is then screwed to the plate 42 by means of threads 44. Thus, a short length of tubing can be screwed into the thread 41' to support another assembly 10 etc. Thus, a plurality of these filtering devices can be connected in series with the plena 19 in each of the ends of the filter devices being in series flow condition to the well tubing which carries the liquid to the surface.

There are a number of ways which have been followed in the industry for constructing sand screens of the prior art type, namely those in which there is a single wire wound surface which is wrapped around a rigid skeleton of suitably large diameter to support the wire turns. There are also other ways of making the prior art screens which need not be discussed at this time.

Figure 6:
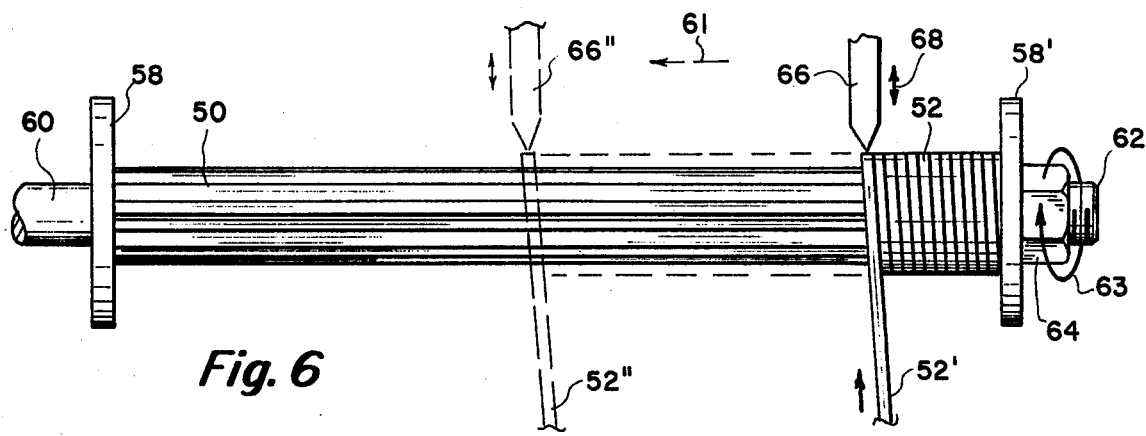
FIGS. 6 and 7 show additional details of the construction of the cylindrical elements of FIGS. 4 and 5.
Figure 7:
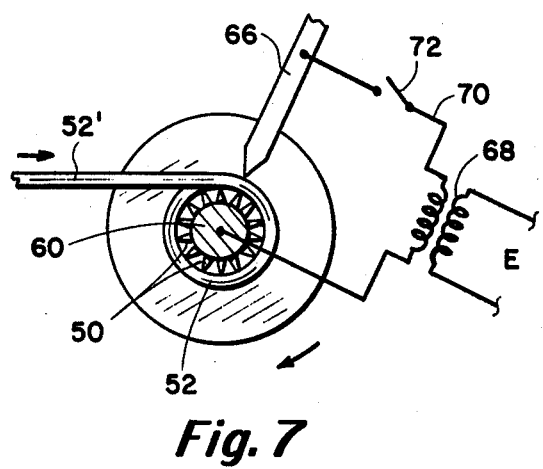
Figure 5:
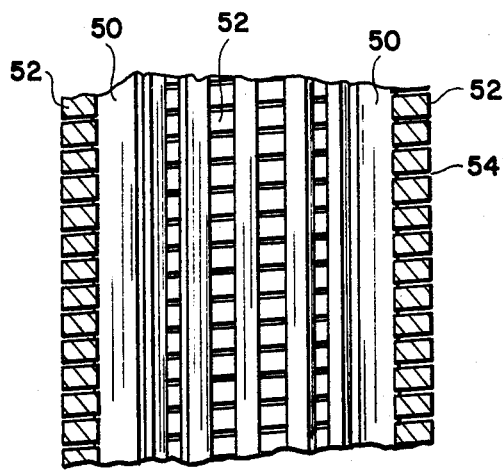
FIGS. 4 and 5 show two views of one method of construction of the tubular elements.
Figure 4:
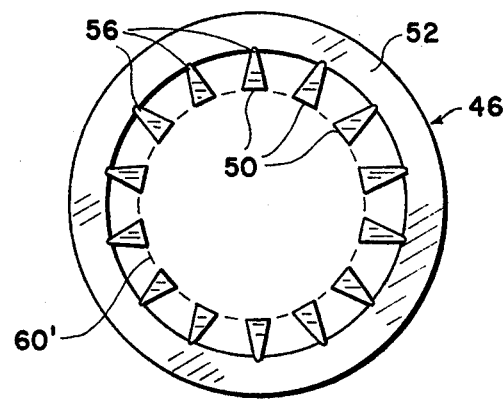

FIGS. 4 and 5 illustrate a way of constructing the tubular elements 46. This comprises a plurality of longitudinal rods 56 which are placed in a selected circular pattern and held between plates 58 and 58' as shown in FIG. 6. There are indentations on the inside walls of the plate 58 and 58' which receive the ends of the rods 56. The rods are further supported on the inside by a mandrel 60 which is indicated by the dashed line 60' of FIG. 4. The plate 58' is tightened to hold the rods 56 rigidly in their recesses in the insides of the plates 58, 58' by means of a nut 64 on the threaded portion 62 of the rod 60. The rod 60 is then placed in a lathe and by attaching one end of a wire 52' to one of the rods 56, the assembly of FIG. 6 can then be rotated as shown. In which case, the wire 52' can be held under tension and will be wound tightly around the rods 50 as the assembly turns in accordance with arrow 63.

Means are provided to spot weld with electrode 66 each contact between the wire 52 on the edge 56 of the elements 50. This electrode 66 is pressed to the outside of the wire opposite each point 56 and a current is passed from a transformer 68, powered by a suitable voltage E, through leads 70 and switch 72 to the electrode 66 and to the mandrel 60. Thus, the wire 52' is spot welded to the rods 50, forming a wire screen 52 which forms with the rods 50 a rigid tubular structure.

While the assembly rotates in the lathe and the turns increase, means are provided to move the welding electrode 66 and the wire 52' toward the left, in accordance with arrow 61 to the position 66" and 52" and so on to the final position adjacent the plate 58. The wire 52' is then cut off, the assembly is removed from the mandrel and the ends are ground off etc. to provide a finished element.

Of course, other ways can be employed to manufacture these elements of any selected diameter and any selected spacing within the diameter permitted for the diameter 17. As mentioned previously, other ways of constructing the tubular elements can be to provide a sintered tube of metal of suitable metallurgy and of selected permeability to the flow of fluid. For other fluids which are corrosive the filter elements can be made of fritted glass spheres of selected small size to provide the suitable permeability or of porcelain and so on.

Figure 8:
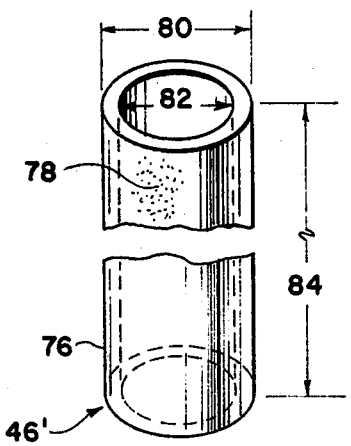
FIG. 8 shows an alternative type of cylindrical element which may be used in place of the wire wound strain and is particularly adapted to the filtering of materials other than sand-laden oil.

Such a tubular element is shown 46' in FIG. 8. A tube 76 has an outer diameter 80 and an inner diameter 82 and is of a selected length 84 and is constructed of a material having suitable interstices or perforations or openings 78 to provide a desired filtering effect and overall cross-sectional area for fluid flow through the wall that may be desired.

While this invention has been described in detail for use in a well borehole for the flow of sand laden oil and gas and is in the class of oil field equipment known as sand screens, it is described solely for the purpose of illustration and is adapted for use in substantially any form where a plurality of small diameter elements can be held in parallel position and parallel flow conditions for filtering any selected liquid or gas and any selected particulate matter.

While I have spoken of a selected size or diameter of opening or a selected permeability to the flow of fluid through the walls of the tubular elements, nothing has been said as to whether these dimensions are the same for all elements. While in most cases all elements will have the same openings, there may be times when some of the elements will have openings or permeabilities different from the others.

One example where such might be desirable is in the area of sand screen filters. The larger the openings, the longer it will take to build up a sand pack around the elements. Consequently, a combination of arrays of elements of small and large openings might provide a more suitable combination than to have all elements with the same size of openings. A typical construction is where the outer ring array of elements are of a screen of larger opening size, e.g., 0.008 inches while the inner ring array are of smaller openings, e.g., 0.004 inches. Any combination, however, is within the purview of this invention.

While the invention has been described with a certain degree of particularity it is manifest that many changes may be made in the details of construction and the arrangement of components without departing from the spirit and scope of this disclosure. It is understood that the invention is not limited to the embodiments set forth herein but is to be limited only by the scope of the attached claim or claims, including the full range of equivalency to which each element thereof is entitled.

What is claimed is:

1. A filter apparatus for separating particulate matter from fluid flowing from a formation within a well comprising:
    (a) a plurality of small diameter, rigid tubular filter elements, the walls of said tubular elements having gauged openings for the flow of said fluid thereacross into the center of said elements;
    (b) means to support said plurality of tubular elements, such that their axes are substantially parallel to the axis of said well and with their outer surfaces unencased and openly exposed to said formation;
    (c) at least one plenum means to which said center space inside said tubular elements are in communication therewith; and
    (d) tubing means connected to the plenum to conduct said filtered fluid to the surface of said well.

2. The filter apparatus as in claim 1 in which said means to support comprises:
    (a) at least one header assembly means to support said tubular elements at their first ends in a selected parallel spacing;
    (b) said at least one plenum inside said header assembly means;
    (c) means to hold said tubular elements at their second ends; and
    (d) tension means to hold said header assembly means to said means to hold.

3. The filter apparatus as in claim 1 in which said means to support comprises:
    (a) a first and a second header assembly means to hold said tubular elements at their first and second ends respectively in a selected parallel spacing;
    (b) a first and a second plenum connected to the insides of said tubular means, one plenum in each header assembly means.

4. The filter apparatus as in claim 3 including means to connect a plurality of said filter apparatus devices in series flow connection.

5. The filter apparatus as in claim 1 in which said tubular elements comprise fritted small glass spheres.

6. The filter apparatus as in claim 1 in which said tubular elements comprise a selected metal and said gauged openings comprise radial perforations.

7. The filter apparatus as in claim 1 in which each of said tubular elements comprises a rigid perforated cylindrical skeleton with wire wound in a helical fashion on the outside of said skeleton and said gauged openings comprise a selected spacing between turns of said wire.

8. The filter apparatus as in claim 1 in which each of said tubular elements has the same permeability.

9. The filter apparatus as in claim 1 in which at least two of said elements has a different permeability.

10. The filter apparatus as in claim 7 in which said spacing between turns is different for at least two elements.

11. The filter apparatus as in claim 7 in which said spacing between turns is the same for all elements.

12. The filter apparatus as in claim 2 in which said header assembly means comprises:
(a) a cylindrical plenum of selected length;
(b) means to seal a pipe to a top end of said plenum;
(c) a first header plate comprising the bottom end of said plenum;
(d) a plurality of holes drilled through said plate of diameter less than the outer diameter of said elements in a selected pattern;
(e) said holes in said plate counterbored at the bottom surface of said plate, to rotatably receive the top ends of said elements;
(f) a second header plate at the bottom of said elements and counterbored at the top of said second plate to rotatably receive the bottom ends of said elements; and
(g) means interconnecting said first and second headers in a fixed position.

13. The filter apparatus as in claim 1 in which said means to support said tubular elements provides freedom of said elements to rotate under the influence of impingement of said flowing liquid against the outer surface of said elements,
whereby the possible erosion of the surface of said elements by said flowing liquid is distributed over the total area of said elements.

14. Apparatus of claim 1 wherein said elements are in circular array.

15. Apparatus of claim 1 wherein said elements are of two concentric inner and outer circular arrays.

16. Apparatus of claim 15 wherein the screen size of said outer array is larger than said inner array.

* * * * *